United States Patent
Rowe (12)

(10) Patent No.: US 6,649,826 B1
(45) Date of Patent: Nov. 18, 2003

(54) GAS COOLED ELECTRICAL JUNCTION ASSEMBLY

(75) Inventor: Charles M. Rowe, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 61 days.

(21) Appl. No.: 09/910,219

(22) Filed: Jul. 20, 2001

(51) Int. Cl.[7] ................................. H01B 7/34
(52) U.S. Cl. ................................. 174/15.6
(58) Field of Search ....................... 174/15.1, 15.6, 174/15.7, 17 LF, 17 GF; 439/190, 191, 194, 196, 331

(56) References Cited

U.S. PATENT DOCUMENTS 5,736,670 A * 4/1998 Carbonell et al. ......... 174/15.6

* cited by examiner

*Primary Examiner*—Chau N. Nguyen

(57) ABSTRACT

A junction assembly has a first electrically conductive junction having at least one inlet and a second electrically conductive junction having at least one outlet. A plurality of electrically conductive flexible connectors are disposed between and attached to the first and second junctions. A casing surrounds the inlet and the outlet such that coolant can flow in from the inlet, throughout the interior of the casing interior, and out through the outlet.

21 Claims, 3 Drawing Sheets

GAS COOLED ELECTRICAL JUNCTION ASSEMBLY

FIELD OF THE INVENTION

The present invention relates in general to a gas cooled electrical junction assembly, and more particularly, to a gas cooled electrical junction assembly located between a parallel ring and main lead used in a turbine generator within a power generation plant.

BACKGROUND OF THE INVENTION

Many power generation plants produce electricity by converting energy (e.g. fossil fuel, nuclear fission, hydraulic head, geothermal heat) into mechanical energy (e.g. rotation of a turbine shaft), and then converting the mechanical energy into electrical energy (e.g. by the principles of electromagnetic induction). Fossil fuel power generation plants typically use a turbine to convert the fossil fuels into mechanical energy and a generator to convert the mechanical energy into electricity.

One aspect of the above-described power generation scheme involves a junction assembly that is located between the generator's parallel rings and the generator's main lead. The junction assembly conducts AC electrical current from the parallel rings to the main lead. The junction assembly must also accept and attenuate the vibration that the parallel rings and coil windings place upon it, as well as withstand the high temperature caused by the electrical current that runs through it.

As shown in FIG. 1, to meet these requirements, a conventional junction assembly 10 typically comprises several flexible connectors 12 (sometimes set back-to-back) secured to a thin, flat elongated junction 14. The flexible, connectors 12 are constructed of conductive wire strands 16 to provide an electrically conductive path and to provide the junction assembly 10 with flexibility to accept the various and varying forces and loads applied by the parallel rings 20, main lead 22 and other generator components. The junction 14 secures the flexible connectors 12 relative to the parallel rings 20 and main lead 22, and has a passageway 18 through which a coolant flows to cool the flexible connectors 12 by conduction.

There are several shortcomings, however, to the above-described conventional junction assembly. One shortcoming involves the tracked coolant route, which causes any and all cooling of the flexible connectors to be performed by conduction along and from the passageway. Another shortcoming of the tracked coolant route involves the undesirable overcooling of flexible connectors located near the coolant inlet and undercooling of flexible connectors located near the coolant outlet.

There is thus a need for a junction assembly that more efficiently cools the flexible connectors. There is also a need for a junction assembly that more uniformly cools the flexible connectors.

SUMMARY OF THE INVENTION

One aspect of the present invention thus involves a junction assembly comprising a first electrically conductive junction having at least one inlet; a second electrically conductive junction having at least one outlet; a plurality of electrically conductive flexible connectors disposed between and attached to the first and second junctions; and a casing surrounding the inlet and the outlet, whereby coolant can flow in from the inlet, throughout the casing interior, and out through the outlet.

Another aspect of the invention involves method of cooling an electrically conductive element comprising providing at least one electronically conductive element disposed between and attached to a second and a third electrically conductive element, the second and third elements each having at least one opening; providing a casing that surrounds the openings in the second and third elements; and flowing coolant through the opening in the second element and through the opening in the third element such that the coolant cools the first element.

Further aspects, features and advantages of the present invention will become apparent from the, drawings and detailed description of the preferred embodiments that follow.

BRIEF DESCRIPTION OF THE DRAWINGS

The above-mentioned and other concepts of the present invention will now be addressed with reference to the drawings of the preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

The invention described herein employs several basic concepts. For example, one concept relates to a junction assembly that more efficiently cools the flexible connectors. Another concept relates to a junction assembly that more uniformly cools the flexible connectors. Another concept relates to a gas cooled junction assembly.

The present invention is disclosed in context of an exemplary generator junction assembly located between a generator's parallel rings and a generator's main lead. The principles of the present invention, however, are not limited to generator junction assemblies located in this particular area, and can be used in connection with other areas within a generator that have similar cooling requirements. It will be understood by one skilled in the art, in light of the present disclosure, that the present inventions disclosed herein can also be successfully utilized in connection with junction assemblies outside the generator field and outside the power generation field that have similar cooling requirements. One skilled in the art may also find additional applications for the apparatus, components, configurations and methods disclosed herein. Thus, the illustration and description of the present invention in context of exemplary junction assemblies is merely one possible application of the present invention. However, the present invention has been found particularly suitable in connection with generator junction assemblies.

Figure 3:
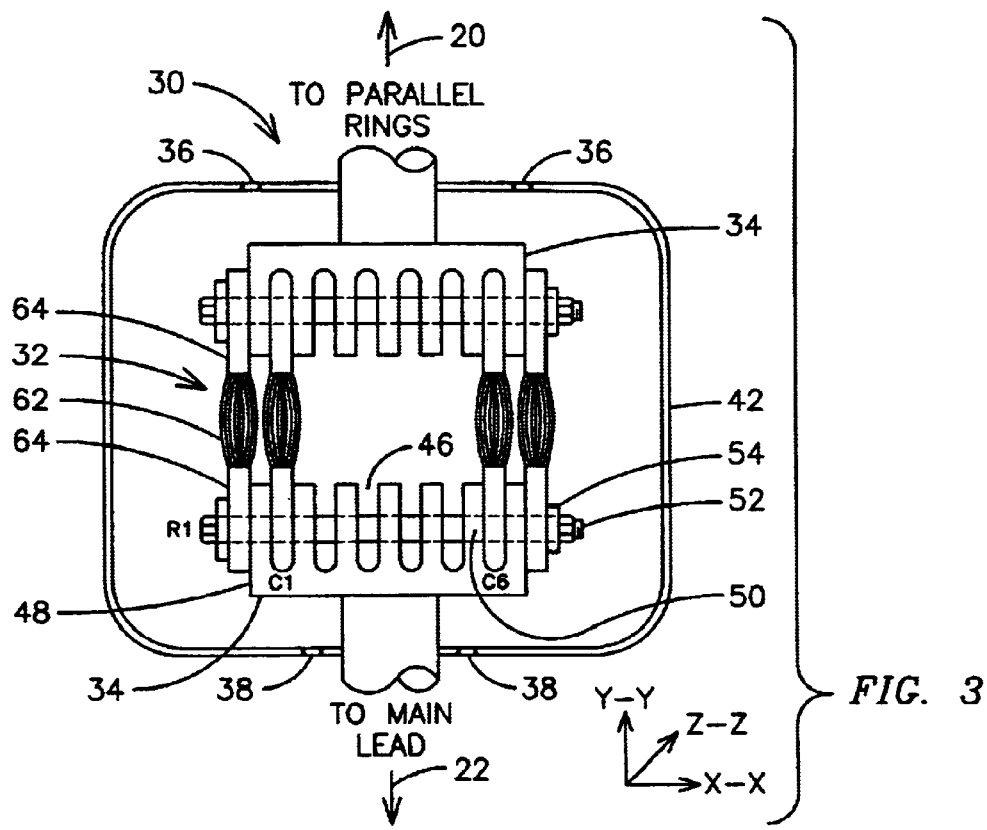
FIG. 3 is a side elevation view of another embodiment of the junction assembly of the present invention.

To assist in the description of the invention described herein, the following terms are used. Referring to FIG. 3, a "longitudinal axis" (X—X) extends along a length of the junction 34. A "lateral axis" (Y—Y) extends along another length of the junction 34. A transverse axis" (Z—Z) extends normal to both the longitudinal and lateral axes, and provides the third or depth dimension of the junction 34. In addition, as used herein, the "longitudinal direction" or "longitudinal length" refers to a direction substantially parallel to the longitudinal axis, the "lateral direction" or "lateral length" refers to a direction substantially parallel to the lateral axis, and the "transverse direction" or "transverse length" refers to a direction substantially parallel to the transverse axis.

Figure 1A:
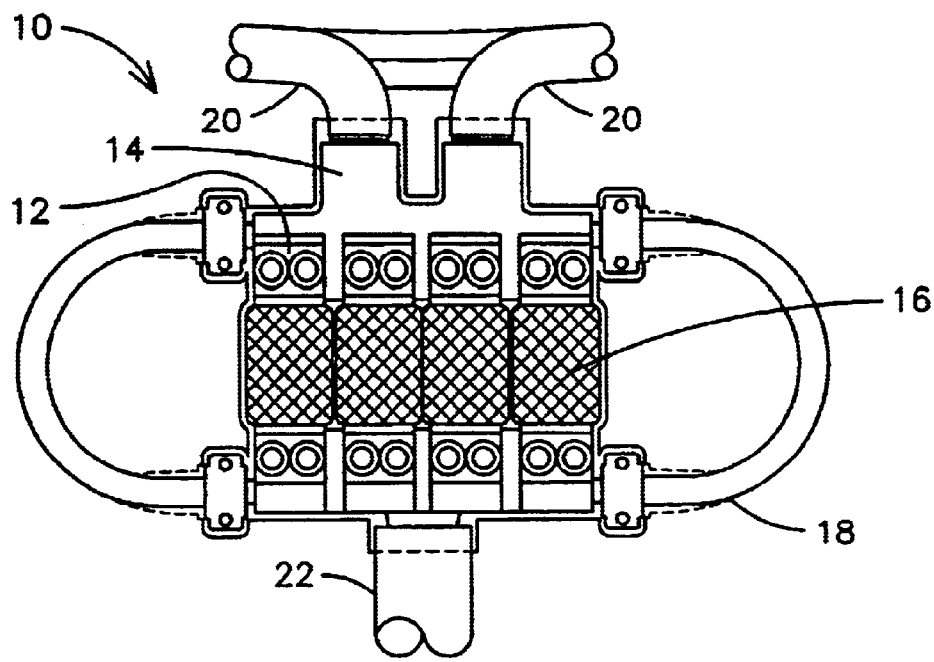
FIG. 1A is a side elevation view of an exemplary prior art generator junction assembly.
Figure 1B:
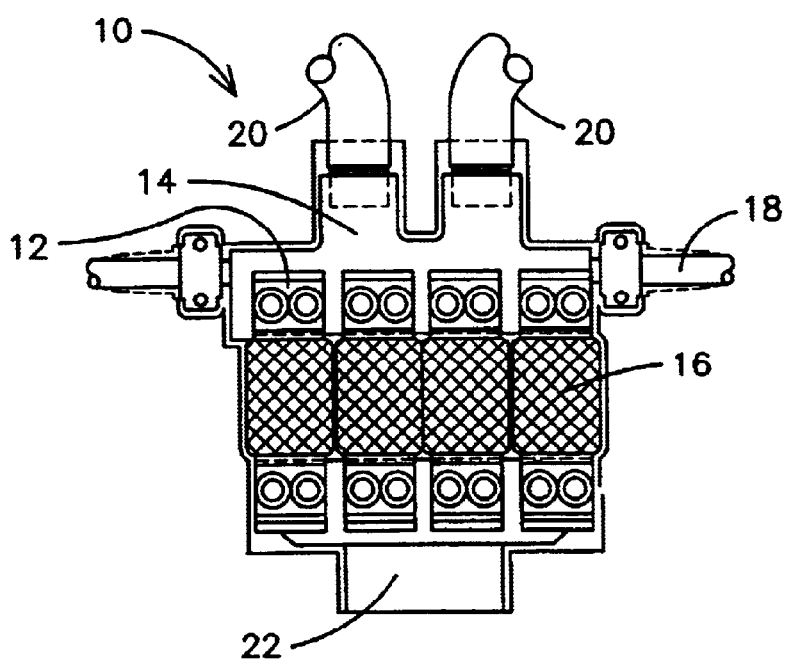
FIG. 1B is a side elevation view of another exemplary prior art generator junction assembly.
Figure 2:
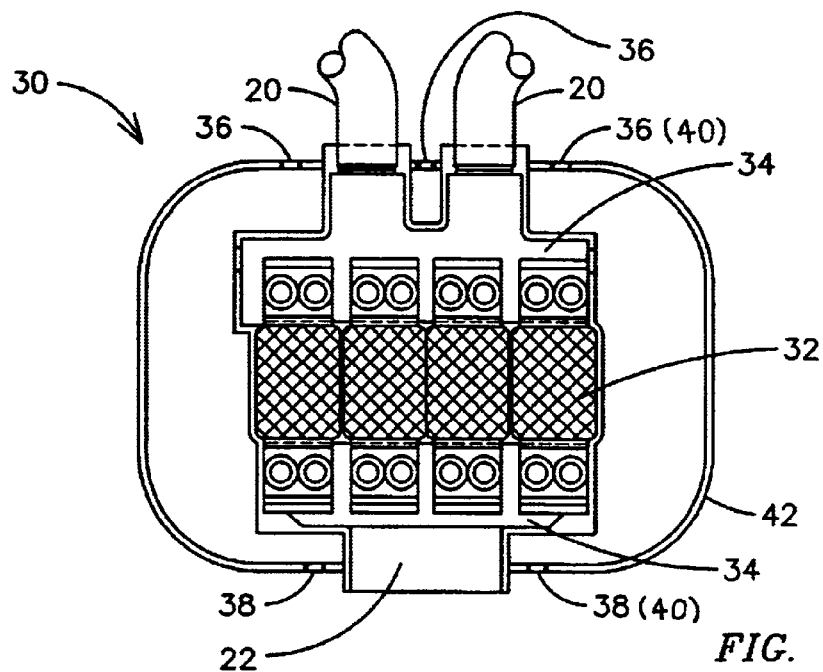
FIG. 2 is a side elevation view of the junction assembly of the present invention, showing a casing surrounding an inlet and an outlet.
Figure 4:
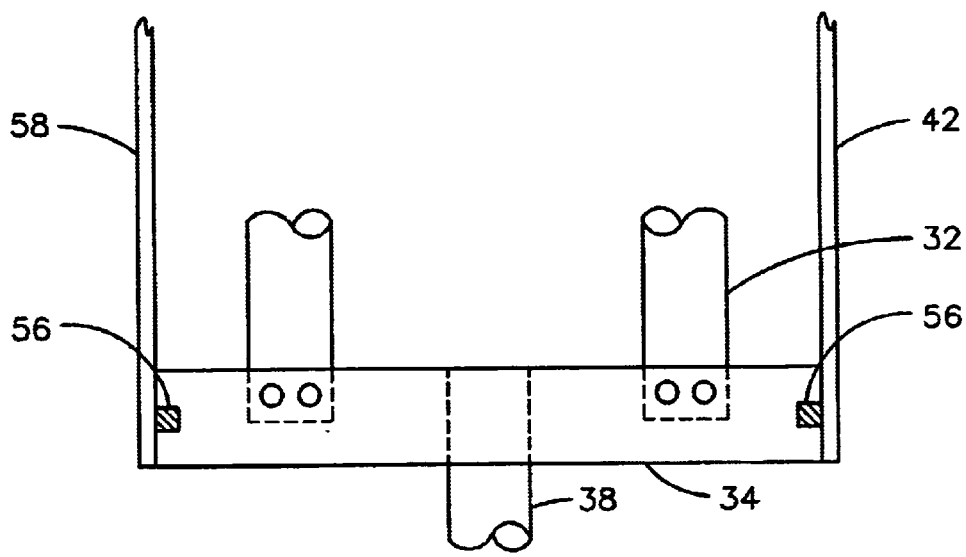
FIG. 4 is a side elevation view of a portion of the junction assembly.

FIG. 2 shows a junction assembly 30 comprising a plurality of flexible connectors 32 and a pair of junctions 34 located between a generator's parallel rings 20 and a generator's main lead 22. The junction assembly 30 includes a casing 42 that surrounds the flexible connectors 32 and junctions 34. The casing 42 (as illustrated in FIG. 2) or the end of the junctions 34 (as illustrated in FIG. 4) have at least one inlet 36 or outlet 38 (more generally, opening 40) through which a coolant (e.g. air, hydrogen, water) flows to cool the flexible connectors 32 and junctions 34. The coolant typically flows at a rate of between about 5 cubic feet per minute, depending on the particular generator with which the junction assembly is used. Suitable coolant pressure is about 2 pounds per square inch to about 10 pounds per square inch.

The number and size of openings 40 through which the coolant flows (i.e. total cross sectional surface area) will also vary depending on the particular generator, coolant, flow rate, pressure, etc. with which the junction assembly is used. For example, hydrogen is about 7 times more efficient than air for cooling purposes. In general, a total cross sectional surface area of about 0.1 inch to about 10 inches is suitable. For example, if used with a an air-cooled generator having about 20,000 to about 30,000 amps of current running through the junction assembly with a flow rate of about 10 cubic feet per minute at a pressure of about 5 pounds per square inch, a total flow rate of about 1 to about 3 inches is suitable.

The illustrated embodiment shows one junction 34 having three openings 36 and the other junction 34 having two openings 38. The openings need not be located in any particular place, and can be disposed uniformly across the longitudinal length of the junction 34, towards the end, sides or perimeter of the junction 34 (where AC current crowding causes higher temperatures), randomly, and the like. For ease of construction, the illustrated openings 40 have a generally cylindrical or elliptical shape and extend generally perpendicular to the flexible connectors 32. However, each opening can have a variety of cross-sectional shapes, such as linear, curved, curvilinear, combinations thereof and the like, and can have an overall path that is linear, curved, curvilinear, combinations thereof and the like, and be disposed in uniform relation to other openings or not so disposed. The openings can also be rifled to help swirl and distribute the coolant through the casing. Further, the opening can also be angled to help direct the coolant to particular areas within the casing, such as where the flexible connectors are located. A flow rate controller (not shown), such as an orifice or restrictor valve can be used to control the flow rate or pressure of the coolant. The openings can also thus have a showerhead type configuration.

Still referring to FIG. 2, a casing 42 surrounds the inlets 36 and outlets 38 to provide a structure within which the coolant is free to move. The casing 42 also provides a restraining mechanism that directs the coolant entering the inlets 36 to exit the outlets 38. The casing 42 is advantageously hermetically sealed, but need not be so. By this configuration, the coolant, particularly when in gas form (i.e., air or hydrogen) can cool the flexible connectors 32 by radiation, as well as by convection and/or conduction. Cooling by radiation provides for a more efficient and even cooling of the flexible connectors 32.

The casing 42 can be embodied in a variety of three dimensional shapes, such as cubical, parallelepiped, prism, cylindrical, spherical, ovoid, discus, conical, pyramidal and the like. FIG. 2 shows the casing 42 having a generally spherical shape.

The casing 42 preferably has a total volume of about 0.1 cubic foot to about 5 cubic feet, depending on the particular generator with which it is used, the number of flexible connectors 32 used, the amount of current running through the junction assembly 30, the type and temperature of coolant used, and the like. For example, if used with an air-cooled generator having about 20,000 to about 30,000 amps of current running through the junction assembly 30, a suitable volume is about 0.5 cubic foot to about 2 cubic feet.

The casing 42 can be made of a rigid or semi rigid insulating material such as fiberglass, glass, combinations thereof and the like to withstand the vibration displacement of about 20 mils during each of several million cycles that the junction assembly 30 experiences and to withstand the typical generator temperatures of about 120° F. However, the casing 42 can be made of a variety of other materials to withstand such vibration and temperature, such as metals, resins, plastics and the like.

FIG. 3 shows another embodiment of the present invention. In this embodiment, the junction 34 has a generally compact or condensed shape (as opposed to elongated) to assist in dispersing electrical current more evenly along the entire shape of the junction 34, thereby addressing AC current crowding and junction assembly vibration. The flexible connectors 32 have a solid portion 64 and flexible wire strand portion 62. The flexible connectors are arranged in a row-and-column pattern within channels 46 (or within individual slots, etc.) within this overall shape. The channels 46 form columns (e.g. C1–C6) extending in the lateral (Y—Y) direction and the flexible connectors 32 in similar locations within different columns form rows (e.g. R1) extending in the longitudinal (X—X) direction.

As exemplified, a pair of junctions 34 having a plurality of channels 46 (e.g. 2–20, 6 illustrated) is shown securing a plurality of flexible connectors 32 (e.g. 2–50, 4 illustrated) to form a junction assembly 30. One junction 34 is adapted to connect with the parallel rings 20 and one junction 34 is adapted to connect with the main lead 22. Two flexible connectors 32 are shown positioned within the outermost channel columns C1, C6 of the junctions 34, and two flexible connectors 32 are secured to the junctions 34 by a bolt 52 that passes through holes 50 in the junctions 34 and a nut 54. Inlets 36 and outlets 38 are arranges on the junctions 34, as explained above. A casing 42 is arranged around the inlets 36 and outlets 38, as explained above.

FIG. 4 shows the casing 42 having a generally square or rectangular shape, an outlet 38, and a pair of flexible connectors 32. A pressure seal 56 is shown as an O-ring or notch to help retain and/or relieve pressure on the walls 58 of the casing 42.

Figure 5:
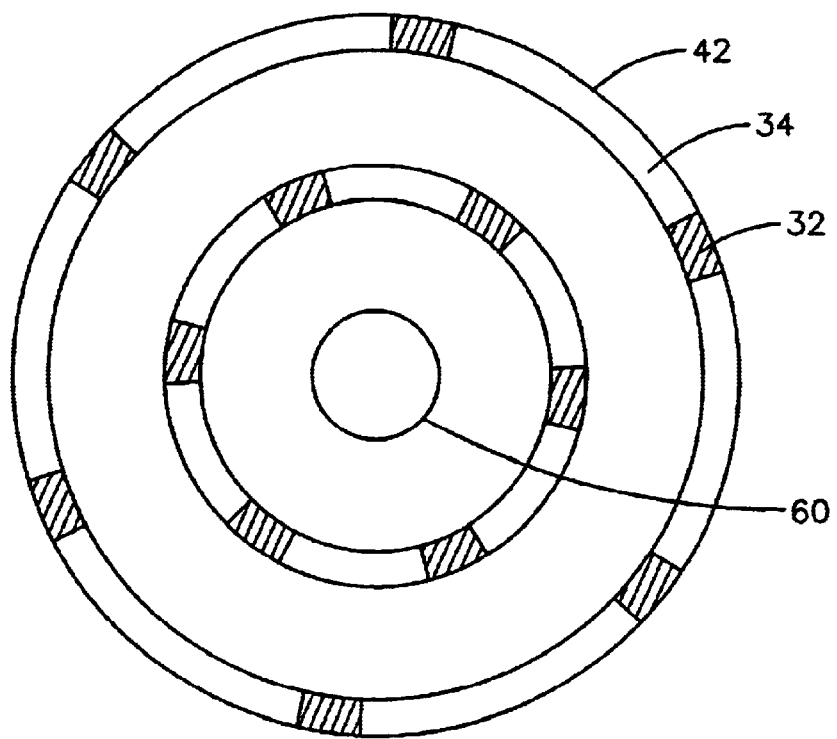
FIG. 5 is a top elevation view of another embodiment of the generator junction assembly of the present invention.

FIG. 5 shows the casing 42 having a generally tubular shape, with two radially extending rows of flexible connectors 32 and a central integral inlet-outlet 60. One skilled in the art will recognize that any number of radially extending rows can be used.

Although this invention has been described in terms of certain exemplary uses, preferred embodiments, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. Accordingly, the scope of the invention is intended to be defined only by the claims that follow.

What is claimed is:

1. A junction assembly comprising:
   a first electrically conductive junction to be connected to at least one first electrical connector;
   a second electrically conductive junction to be connected to at least one second electrical connector;
   a plurality of electrically conductive flexible connectors disposed between and attached to the first and second electrically conductive junctions; and
   a casing surrounding said first and second electrically conductive junctions and said plurality of electrically conductive flexible connectors;
   said casing having at least one first fluid coolant port therein adjacent said first electrically conductive junction and at least one second coolant fluid port adjacent said second electrically conductive junction to permit a flow of coolant fluid through said casing to thereby cool said first and second electrically conductive junctions and said plurality of electrically conductive flexible connectors.

2. A junction assembly according to claim 1 wherein said at least one first fluid coolant port comprises a single first fluid coolant port.

3. A junction assembly according to claim 1 wherein said at least one first fluid coolant port has a generally circular cross-sectional shape.

4. A junction assembly according to claim 1 wherein said at least one second fluid coolant port comprises a single second fluid coolant port.

5. A junction assembly according to claim 1 wherein said at least one second fluid coolant port has a generally circular cross-sectional shape.

6. A junction assembly according to claim 1 wherein each flexible connector comprises wire strands, and wherein each flexible connector is connected to said first and second electrically conductive junctions with at least one bolt.

7. A junction assembly according to claim 1 wherein said casing has a cubic, spherical or tubular shape.

8. A junction assembly according to claim 1 wherein said casing has a volume of at least about 0.1 cubic feet.

9. A junction assembly according to claim 1 wherein the casing is made of a rigid or semi-rigid material.

10. A junction assembly according to claim 1 wherein casing is hermetically sealed.

11. A junction assembly according to claim 1 wherein the flow rate of the coolant fluid is about 5–20 cubic feet per minute.

12. A junction assembly according to claim 1, wherein the coolant fluid pressure is about 2–10 pounds per square inch.

13. A junction assembly according to claim 1 wherein the junction has a generally compact shape.

14. A junction assembly for an electrical power generator including a main lead conductor and at least one parallel ring conductor, the junction assembly comprising:
   a first electrically conductive junction to be connected to the main lead conductor;
   a second electrically conductive junction to be connected to the at least one parallel ring conductor;
   a plurality of electrically conductive flexible connectors disposed between and attached to the first and second electrically conductive junctions; and
   a casing surrounding said first electrically conductive junction, said second electrically conductive junction and said plurality of electrically conductive flexible connectors;
   said casing having at least one first fluid coolant port therein adjacent said first electrically conductive junction and at least one second coolant fluid port adjacent said second electrically conductive junction to permit a flow of coolant fluid through said casing to thereby cool said first electrically conductive junction, said second electrically conductive junction and said plurality of electrically conductive flexible connectors.

15. A junction assembly according to claim 14 wherein said at least one first fluid coolant port has a generally circular cross-sectional shape.

16. A junction assembly according to claim 14 wherein said at least one second fluid coolant port has a generally circular cross-sectional shape.

17. A junction assembly according to claim 14 wherein each flexible connector comprises wire strands, and wherein each flexible connector is connected to said first and second electrically conductive junctions with at least one bolt.

18. A junction assembly according to claim 14 wherein said casing has a cubic, spherical or tubular shape.

19. A junction assembly for an electrical power generator including a main lead conductor and at least one parallel ring conductor, the junction assembly comprising:
   a first electrically conductive junction to be connected to the main lead conductor;
   a second electrically conductive junction to be connected to the at least one parallel ring conductor;
   a plurality of electrically conductive flexible connectors disposed between and attached to the first and second electrically conductive junctions; and
   a casing surrounding said first electrically conductive junction, said second electrically conductive junction and said plurality of electrically conductive flexible connectors;
   said casing including
      at least one first fluid coolant port having a generally circular cross-sectional shape and being adjacent said first electrically conductive junction, and
      at least one second coolant fluid port having a generally circular cross-sectional shape and being adjacent said second electrically conductive junction.

20. A junction assembly according to claim 19 wherein each flexible connector comprises wire strands, and wherein each flexible connector is connected to said first and second electrically conductive junctions with at least one bolt.

21. A junction assembly according to claim 19 wherein said casing has a cubic, spherical or tubular shape.

* * * * *